UNITED STATES PATENT OFFICE.

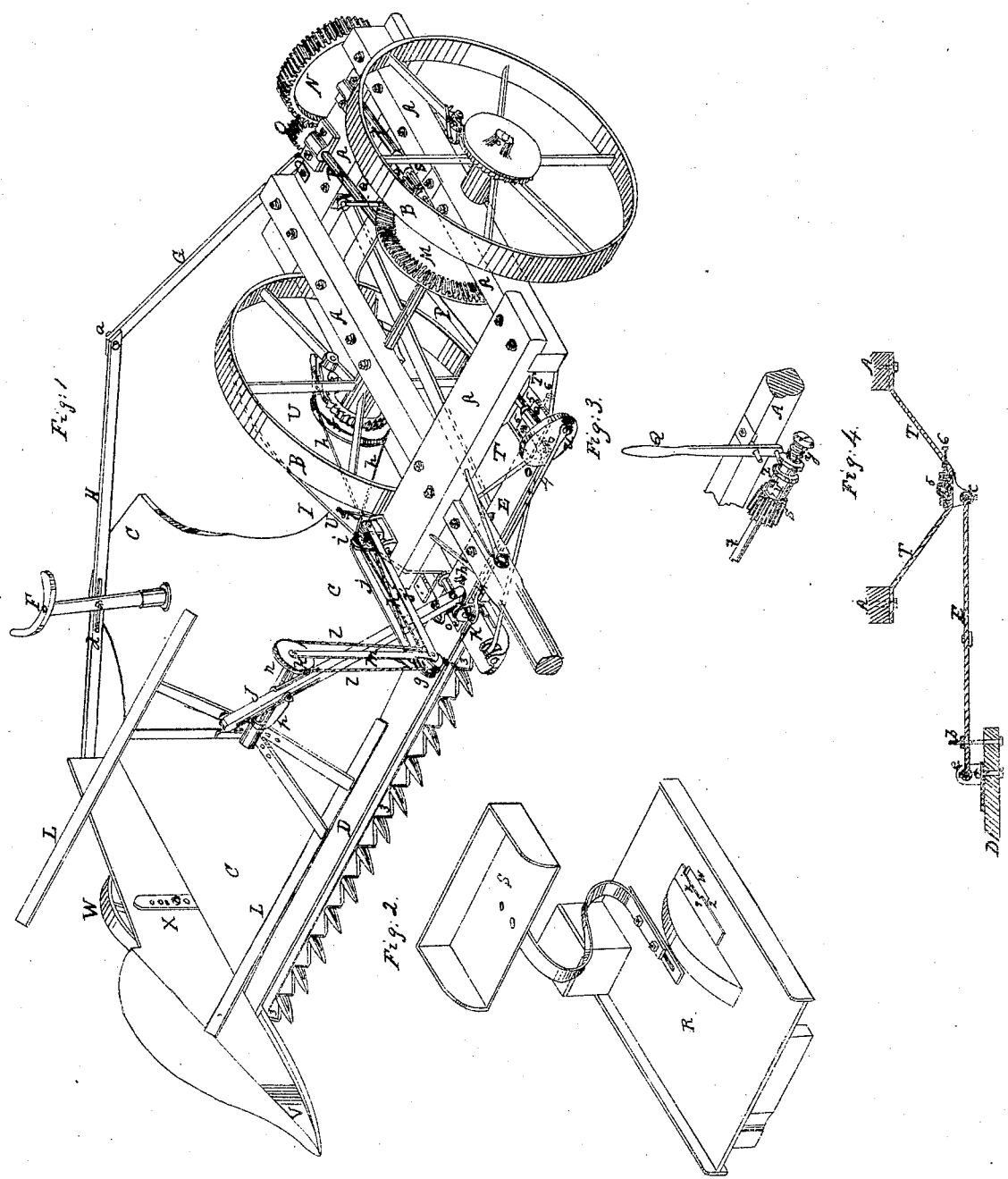

LEWIS MILLER AND JACOB MILLER, OF CANTON, OHIO.

IMPROVEMENT IN HARVESTERS.

Specification forming part of Letters Patent No. 35,830, dated July 8, 1862.

*To all whom it may concern:*

Be it known that we, LEWIS MILLER and JACOB MILLER, of Canton, in the county of Stark and State of Ohio, have invented certain new and useful Improvements in Harvesting-Machines; and we do hereby declare that the following is a full, clear, and exact description of the same, reference being had to the accompanying drawings, making a part of this specification, in which—

Figure 1 represents in perspective a view of the machine with the cover and seat removed to show the gearing underneath them. Fig. 2 represents in perspective the cover and seat detached or removed from the machine. Fig. 3 represents in perspective the clutching and unclutching mechanism to throw the cutter into or out of action. Fig. 4 represents a section through the hanger, coupling-bar, and a portion of the finger-bar.

Similar letters of reference, where they occur in the several figures, denote like parts of the machine in all the drawings.

The object of our invention is, first, the so hanging and driving of the reel as that it will accommodate itself to the platform as the platform rises or falls in passing over uneven ground, and be also capable of being raised or lowered to any required height without changing the length of the chain or chains, belt or belts, or band or bands by which it is driven.

Another object which we have in view is the so making and uniting the journal-box of the crank-shaft to the hanger that supports it as that the box may be closed up to the journal, as it is worn away in the direction in which the greatest strain comes against it.

The mechanism and devices by which we accomplish these several objects or purposes we will now proceed to describe in connection with the drawings.

A represents the main frame, and B B the main driving and supporting wheels.

C is the platform, which is united to the finger-bar D, and through the coupling-bar E and its braces is united at its front to the main frame A; but as the raker's stand F is placed on the platform, and the raker riding there would make the platform heavy and lagging, this front bracing alone would not answer a good purpose. Braces have been placed at the rear of the platform, extending to and united with the main frame; but our object being to get a short platform and a clear gaveling-space behind it and near to the main frame, we cannot of course use a brace there such as has heretofore been used, as it would incumber the space we want left clear and defeat the object we are aiming at. We connect a brace, G, to the rear portion of the main frame by a pin or bolt on which it can move. The end of the brace projects outward and upward until it meets another brace, H, fastened to the raker's stand F, which projects upward and inward, the two braces being united where they meet, as at *a*, and thus the raker's stand and the platform are firmly braced by these braces, while the braces themselves are not in the way of the raker or the easy delivery of the gavel from the platform. That portion of the platform where the delivery of the gavel is made is cut away, as seen at I, so as to make the platform at that point very short, and the grain has to be moved but a short distance and with but little bodily exertion by the raker to deliver it in a compact gavel upon the ground. The elevation of the braces G H leaves this gaveling-space I entirely clear, and the raker has simply to sweep the grain square across the platform into this open gaveling-space without giving to his rake, his arms, or his body a circular motion. The platform, having front and rear braces both, is sufficiently strong to carry the raker without lagging or making excessive side draft.

When the finger-bar D and coupling-bar E are made rigid by means of the screw *b*, then the hinge of the coupling-bar at *c* and the hinge of the brace G are nearly in the same plane, sufficiently so to allow the platform C to rise and fall to such inequalities as the surface of the ground may present. The brace H may have a slot, *d*, in it, so that it or the platform may be adjustable as to height, or to correspond with the adjustment of the screw *b*. When the screw *b* is removed, the joint or hinge is at *e* as well as at *c*.

On the grain-side drive-wheel there is a pulley, *f*, around which and around a pulley, *g*, passes an endless belt, *h*, (shown in red lines,) said belt passing over and under friction-rolls *i*, where the arms or pulley-supporter *j* are hinged. The pulley *g* is a double one, and from one of them to the pulley *k* passes an endless belt, *l*, (shown in red lines,) the pulley k being supported by an arm, m, that is hinged or pivoted at the center of the pulley g, where also the arms j are hinged, so that between the pulley f and the pulley k there are two hinged connections or two hinged pulley-supporters, j m, in addition to the hinged friction-pulley supporter n, which allows the platform, in rising and falling, to carry the supporters j m with it. The object in so connecting and driving the reel is that the reel may be raised or lowered or set out or in without changing the length of the belt or belts.

We have shown the reel as being driven by two belts. It is obvious that three may be used without changing the result of the driving—as, for instance, one belt may run from f to i, a second from i to g, and a third from g to k. To strain up the belt or belts as they become stretched by use, a screw-buckle may be used in the pulley-supporters j m, and when strained up the reel can be raised or lowered or set out farther toward or from the grain without changing the belts, as the distances from f to i, from i to g, and from g to k do not vary. Of course the sum of their distances (which is the length of the belt or chain) does not vary.

J is a reel supporter or post. The foot of this post is connected and can be adjusted upon a plate, o, that is connected to the shoe K, and which curves over the hinge-joint e between the finger-bar and the coupling-bar. The top of the reel-post is slotted to admit of an adjusting-screw that holds the reel-shaft supporter p to the reel-post and allows it to be raised or lowered thereon. The reel-shaft supporter has two bearings on it, in which the shaft r of the reel L turns, and we dispense with an outside reel-post.

The bevel-gear wheel M on the main axle turns the pinion s, Fig. 3, on the shaft t, and through the gears N O and shaft P the crank-wheel u, that drives the cutters, is worked. There is a clutch, v, on the shaft t, which is operated by the lever Q, that is pivoted to the main frame and extends up through an opening, w, in the foot-board or cover R, in convenient proximity to the driver or conductor in his seat S. The lever Q has a spring behind it to force it toward the recess x of the slot w, and the clutch v has a spring, y, behind it, which tends to keep it in gear with the pinion s. In the barrel of the clutch there is a slot, in which the pin z is placed that causes the clutch to turn with the axle. Now, when the lever Q is against the shoulder 1, the clutch is disconnected from the pinion, and when the lever is against the shoulder 2 the clutch and pinion are connected and will turn together, and thus, whether the clutch be in or out of action with the pinion, there is no undue friction between them or caused by them, as the slot in the barrel of the clutch and the pin in the shaft limit the extent of motion of the clutch, and the operator cannot force the clutch a particle beyond the limit of the pin and slot, nor apply friction to the pinion to hold it too hard, either in or out of gear, as it is entirely loose and free from end-thrust in either direction.

The front end of the shaft P, that gives motion to the crank-wheel u, and to the cutters 3 through the pitman 4, has its bearing in the hanger T in a split or divided journal-box, 5, which, by means of a set-screw, 6, or other equivalent adjusting device, may be set up to the journal of said shaft P, as it wears away at the points of greatest friction or resistance, which points are in the plane of the reciprocation of the pitman or cutters, and thus all shackling or loose motion at that point is avoided. The journal-box is split or divided in the line of the length of the shaft P.

The fence U, against which the grain is raked previous to its being delivered on the ground in a gavel at I, is made in sections and hinged together, so as to allow the platform to rise and fall and still keep a close fit between the fence and the main frame, said fence being hooked up to the main frame by a hook, 7, and a proper staple or catch.

V is the outside divider, and W the outside supporting-wheel, which latter is made adjustable at X to set the platform and cutters at the desired height above the ground.

There are other parts of this machine which we do not describe, as they are represented on the drawings, and are in use under other patents granted for what is known among farmers as the "Buckeye Machine," and further description of them is deemed unnecessary.

Having thus fully described the nature and objects of our invention, what we claim therein is—

1. The combination and arrangement of the jointed pulley-supporters j l between the drive-wheel and reel-shaft, so that the reel may accommodate itself to the rising and lowering of the platform, and be susceptible of being raised or lowered on the reel-post without slacking the belt or belts, substantially as described.

2. In combination with the hanger, the split or divided journal-box and adjusting device connected to it, so that the journal-box, as it wears away in the direction of the resistance of the pitman or cutters, may be set up to the shaft that works the cutters, substantially as and for the purpose set forth and explained.

LEWIS MILLER.
JACOB MILLER.

Witnesses:
JOHN LAHM,
DANL. TONNER.